United States Patent [19]

Oetiker

[11] 4,237,584
[45] Dec. 9, 1980

[54] CLAMP STRUCTURE, ESPECIALLY AXLE SLEEVE CLAMP

[76] Inventor: Hans Oetiker, Oberdorfstrasse 21, Horgen, Switzerland

[21] Appl. No.: 915,466

[22] Filed: Jun. 14, 1978

[51] Int. Cl.³ .................................................. B65D 63/06
[52] U.S. Cl. .............................. 24/23 EE; 24/20 CW
[58] Field of Search ............ 24/23 EE, 23 R, 20 CW, 24/20 R, 19, 68 BT, 20 EE, 22; 285/252

[56] References Cited

U.S. PATENT DOCUMENTS

| | | | |
|---|---|---|---|
| 3,303,669 | 2/1967 | Oetiker | 24/20 CW X |
| 3,531,849 | 10/1970 | Bishop et al. | 24/23 R X |
| 3,789,463 | 2/1974 | Oetiker | 24/20 CW |
| 4,103,399 | 8/1978 | Oetiker | 24/23 R X |
| 4,106,799 | 8/1978 | Oetiker | 24/20 R X |

FOREIGN PATENT DOCUMENTS 1575159 1/1970 Fed. Rep. of Germany ...... 24/20 CW
454650 5/1913 France .................................. 24/23 EE Primary Examiner—Ramon S. Britts
Attorney, Agent, or Firm—Craig & Antonelli

[57] ABSTRACT

A clamp structure for clamping a hose-like member onto a circular support and capable of contraction from a larger to a smaller diametric dimension without loss of the circular configuration and without any internal projections, especially for use with relatively harder and thinner hose-like materials, in which the area underneath the ear is covered off during contraction to prevent leakage thereat and in which the open ends of the band can move relative to one another to change from the larger to the smaller diametric dimension while retaining a circular configuration where in engagement with the hose-like member.

42 Claims, 17 Drawing Figures

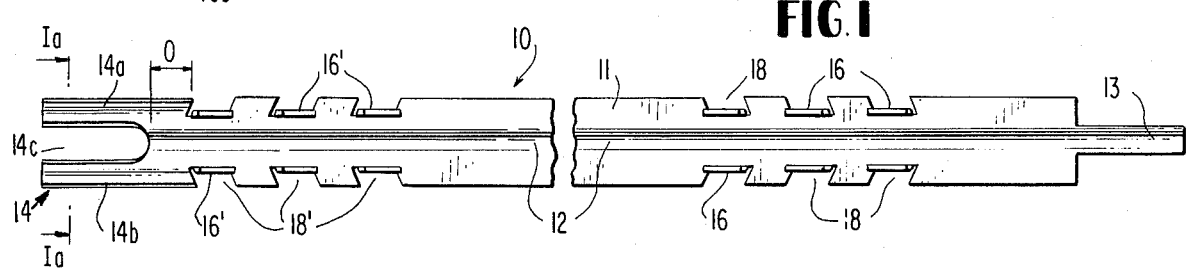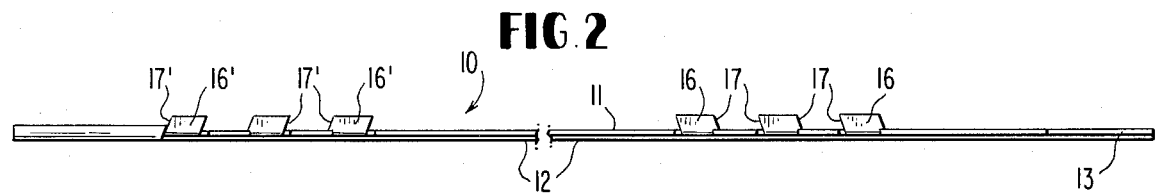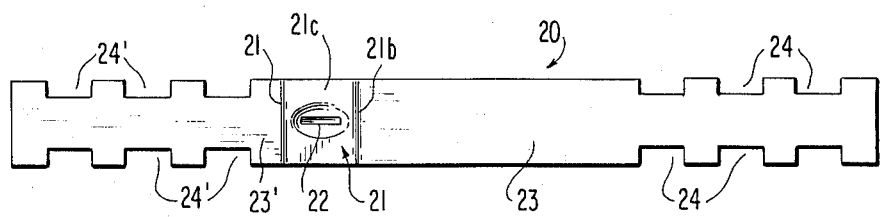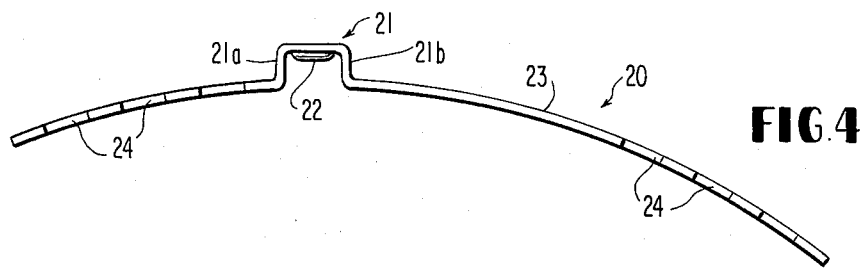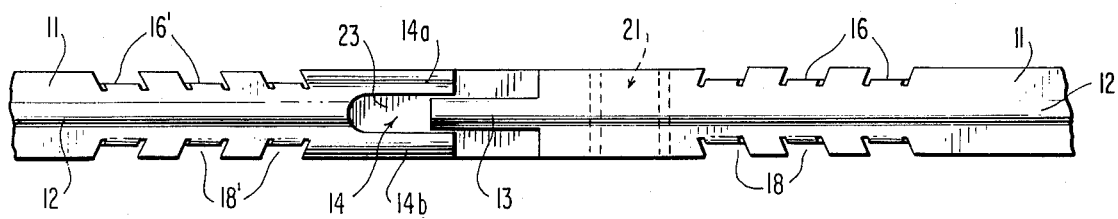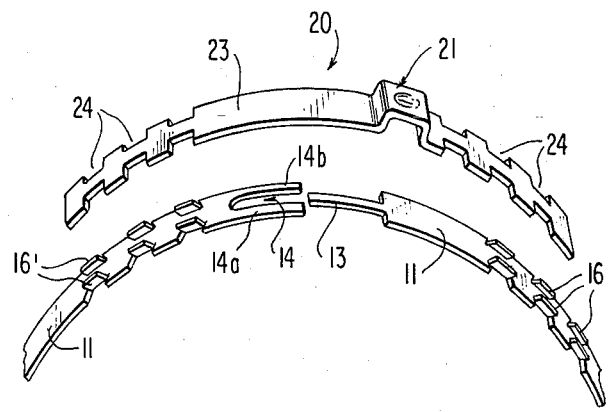

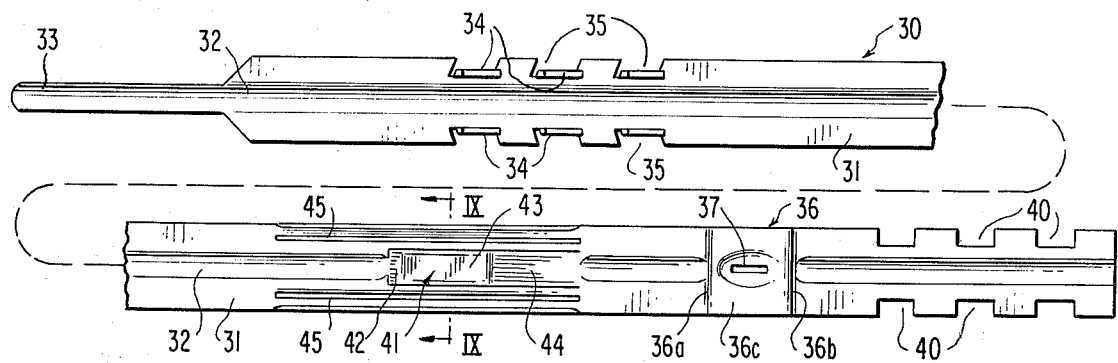
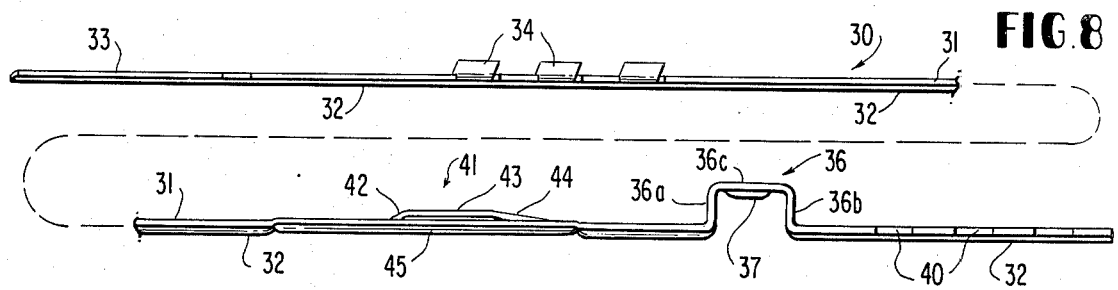
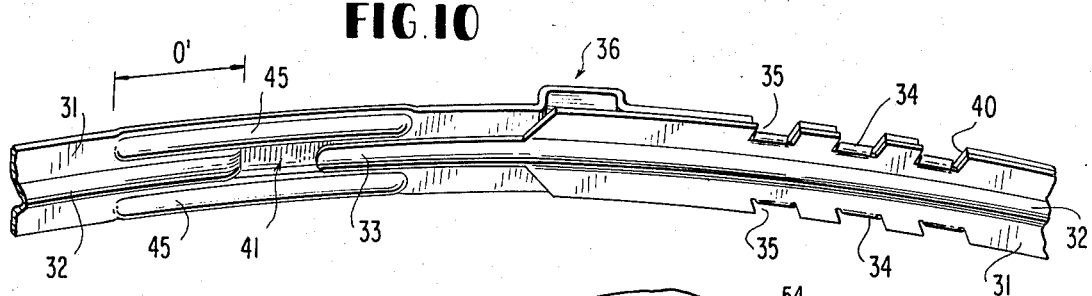
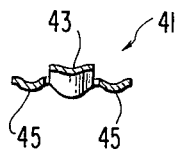
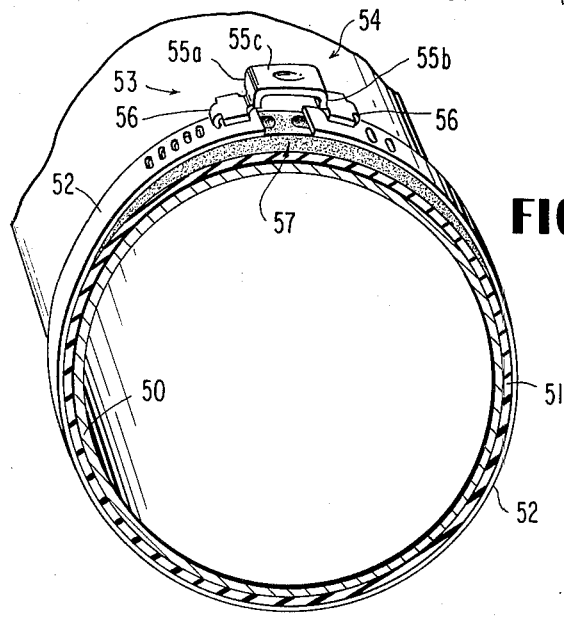

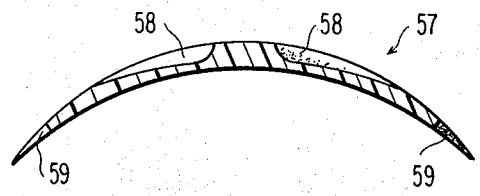
FIG.12
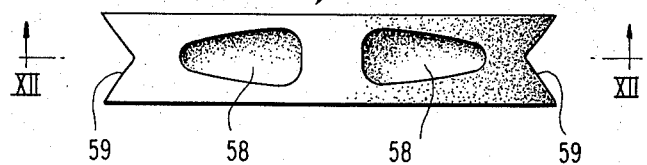
FIG.13
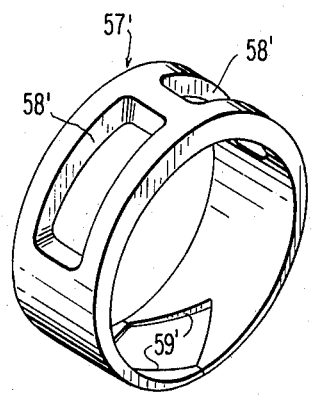
FIG.14
FIG.15
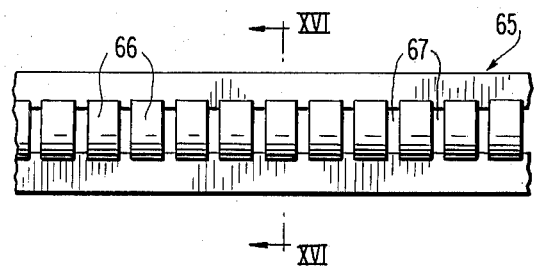

CLAMP STRUCTURE, ESPECIALLY AXLE SLEEVE CLAMP

The present invention relates to a hose clamp, and more particularly to a clamp structure for use with an axle boot made of a relatively inelastic thin-walled synthetic plastic material with a relatively great hardness.

Hose clamps provided with one or more so-called "Oetiker" ears (U.S. Pat. Nos. 2,614,304 and 3,082,498) have proved themselves over many years in numerous applications. So-called band clamps utilizing a perforated band cut to suitable length and tightened about a hose-like object by the use of a clamping member with one or more "Oetiker" ears (U.S. Pat. No. 2,847,742) have also been widely accepted. Nevertheless, occasional problems existed, particularly in special applications, to prevent the hose material from being squeezed into the more or less narrow gap existing under the ear, after the latter has been deformed to contract the band clamp. To avoid this problem, insert rings (U.S. Pat. No. 3,303,669) or bridging members (U.S. Pat. No. 3,789,463) were proposed heretofore. While these approaches offered an effective solution to prevent the hose from being squeezed out into the gap underneath the ear to prevent leakage at this place, they entailed again certain other disadvantages. More particularly, the bridging member as well as the insert ring, even if made of relatively thin material, represented a sudden change in inner diametric dimension of the clamp structure which not only could lead occasionally to slight leakage places but also represented an even present danger for damaging the hose by the more or less sharp edge thus present. Moreover, the thinner the material for the bridging member, the greater is the danger that the bridging member will also be displaced into the gap under the ear, even if the bridging member is provided with one or more stiffening grooves in the circumferential direction. The inwardly extending hooks of the band clamp (U.S. Pat. No. 2,847,742) also represented a source of danger of damage to the hose material since these hooks extended through the ladder-type band material into the surface of the hose material. However, in general, with relatively elastic hose materials having a Shore hardness not exceeding 60, these problems were non-existent for the most part with the aforementioned clamps, especially when these elastic hose materials were also relatively thick.

An overlap of the free end of an open band clamp as well as outwardly projecting teeth were proposed to alleviate some of these problems (U.S. Pat. No. 3,475,793). However, this approach left unsolved the problem of the step caused by the end of the overlapping end and of any present sharp edges of the free end of the band, not to mention the fact that outwardly extending teeth pose other problems as to holdability of the clamp.

The German Gebrauchsmuster No. 1,851,827 represented another attempt to solve this problem. However, the hook engaging from the outside into the opening of the band material again represented a source of danger of damage to the hose material while the free end of the overlapping inner end of the band material continued to be a source for non-tightness and possible damage to the hose for reasons pointed out above. The arrangement without outwardly projecting hooks (U.S. Pat. No. 3,321,811) not only entailed problems as regards holdability but still did not solve effectively the problem of the overlapping free end of the band. Attempts to grind the tongue-like projection in the U.S. Pat No. 3,821,811 to terminate wedge-shaped in the circumferential direction, not only proved to be extremely costly but also could be used only with relatively soft hose material and therefore did not provide an effective solution for relatively hard, thin-walled hose materials. The provision of a groove-like indentation in the center area of the band where the free end of the tongue-like projection would come to lie when the clamp of this type is installed, also did not provide a satisfactory solution since the groove-like indentation caused a reinforcement or stiffening of the band at the corresponding location so that the band was less likely to deform at that place during contraction of the ear and to conform to a desired circular configuration but instead sought to retain its more or less rectilinear configuration within this area thereby representing a place of possible non-tightness.

In addition to the aforementioned shortcomings and problems, there always existed the need for a hose clamp in which a perfectly circular configuration could be closed from a larger to a smaller diameter without any inner projections or offsets in the clamp or without any outward displacement or migration of the hose material. To date, this problem has been solved only by shrinking a circular ring over the hose material. More particularly, a Magnaform machine has been used in the automotive industry to shrink a circular copper ring over the axle boots usually made of neoprene or similar material. Such a machine is not only very expensive as to its initial investment but requires a relatively large amount of working space. Moreover, the operational expenses are very high and the only material which can be economically used is copper which is also relatively expensive. To date, no hose clamp available in the open market offers the possibility to duplicate the clamping action of the Magnaform system, i.e., to tighten a plastic circular object by decreasing its diameter to a smaller diameter while maintaining a circular configuration, i.e., without any projecting parts or offsets along the inside of the clamp.

These problems are magnified with the advent of synthetic plastic materials having a greater hardness, i.e., less elasticity, and especially of smaller wall thickness. For example, with the development of an axle boot of "Hytrell" material having a hardness of about 90 Shore or more, all prior clamping devices including even the Magnaform system render it impossible to provide a sufficiently tight clamping action to prevent the leakage of oil present in the axle boot. Neoprene rubber, having a hardness of about 60 Shore which was used heretofore for axle boots, represented a relatively elastic element, which did not pose the same problems. Moreover, copper has a much lower tensile strength than, for example, carbon or stainless steel and would yield, when used in an attempt to clamp a harder material such as Hytrell.

It is the aim of the present invention to provide a clamp structure which avoids the aforementioned shortcomings by simple means. The underlying problems are solved according to the present invention in that the band, preferably provided with a central rib-like projection includes at one of its ends a tongue-like extension, continuing the rib-like projection while its opposite end is of fork-shape provided with a central recess between two fork-like members of such size as to accommodate the tongue-like projection between the two resulting fork-like members. Each of the two fork tines is thereby provided with a radially inwardly extending rib-like projection extending from the end of a respective tine in overlapping relationship to the central rib-like projection in the band. The band is punched-out or stamped-out in several places spaced at predetermined distances from the ends of the band to provide two rows of spaced teeth extending at right angle to the band surface in the radially outward direction by bending the thus cut tabs at right angle. Preferably, the cuts for the tabs are made at an angle to the circumferential direction other than 90° in order that the rear end surfaces of the teeth slope in such a manner that the distance to a respective band end increases in the circumferential direction as one proceeds from the radially inner to the radially outer end of a respective tooth, whereby the likelihood of a disengagement of the band in the installed condition is lessened during contraction of the ear due to the self-holding action.

A clamping member provided with an "Oetiker" ear is then used which is provided with a number of complementary rectangular cut-outs made from both sides of the band near its two ends which are able to be engaged by the two rows of teeth. Preferably the ear is provided with a groove in the circumferential direction to increase its holding ability. This arrangement offers the advantage that the band material can be made of relatively thinner flexible material while the clamping member can be made of relatively thicker, stronger material so that a high clamping force can be produced by the clamping member, yet the clamping band retains a high degree of flexibility to adapt itself to a circular configuration as it changes from a larger to a smaller diametric dimension. Moreover, the same clamping member can be used for clamps of different diameter by merely bending the clamping member to a radius of curvature corresponding to the desired diametric dimension.

In another embodiment of the present invention, the band and clamping member are made in one piece, thereby requiring only one set of two rows of teeth near the inner overlapping end of the band and only one set of cut-outs near the other outer end of the band. The central rib-like projection is thereby discontinued within the area where the free end of the tongue-like projection will come to lie in the installed condition of the clamp and two similar lateral rib-like projections are provided within this area within the band on opposite sides thereof so as to form in effect a configuration similar to the fork-like configuration of the first-mentioned embodiment to accommodate the tongue-like extension. Moreover, to assure a completely satisfactory circular closing of the band, the area where the tongue-like extension would come to lie in the installed position of the clamp, may be punched-out within the central area of the band to form a recess into which the tongue-like extension can disappear, surrounded on both sides by the rib-like projections in the band. While this embodiment eliminates the possibility of using different material thicknesses for the band and the clamping member, it offers certain advantages in simplicity of manufacture, cost of shipping and ease of installation.

As an alternative to the underlying problems, the present invention also proposes a solution which utilizes a wedge-shaped insert provided with recesses in the external surface thereof to receive inwardly projecting ends of hooks engaging in corresponding openings provided in the flat band, much in the manner as disclosed in U.S. Pat. No. 2,847,742. This arrangement entails several advantages. On the one hand, a flat band material with already existing openings may be used as shown in the aforementioned U.S. Pat. No. 2,847,742 or, in the alterantive, a flat band material without any openings may be used which can be cut to suitable length and openings can then be provided by the use of a punching tool. Secondly, it permits a clamping member, possible of thicker material than the band material, of the type as shown in said U.S. Pat. No. 2,847,742 which includes hooks that extend radially inwardly, but without the danger of damaging the band material. An arrangement with inwardly extending hooks is preferable over radially outwardly extending teeth since the inwardly extending hooks tend to tighten the band over the hose material. Finally, the wedge-shaped insert member can be made by simple means, for example, by the use of conventional mass-production techniques utilizing relatively hard materials such as wood, aluminum or synthetic resinous material, e.g., nylon, Hytrell and the like. Polyvinyl chloride (PVC) has proved itself particularly appropriate. On the other hand, this arrangement entails assembly disadvantages since it is more difficult to install in mass-production facilities.

Finally, as pointed out above, the use of embossments, grooves, or indentations causes the band material to become reinforced, i.e., less flexible. However, this can be readily overcome in accordance with the present invention, for example, with a rib-like projection, by providing appropriate slots in the rib-like projection which do not significantly weaken the material yet restore the flexibility thereof.

Accordingly, it is an object of the present invention to provide a clamp structure, especially an axle boot clamp, which avoids the aforementioned shortcomings and drawbacks by simple means.

Another object of the present invention resides in a hose clamp which permits a reduction in the diametric dimension of a circle from a larger to a smaller diameter without internal projections that might cause leaky places and/or damage to the plastic hose material.

A further object of the present invention resides in a clamp structure which is suitable to clap a relatively hard, thin-walled hose material onto a relatively fixed support member, such as a nipple or other circular supporting structure, in which the band can be so tightened about the relatively hard hose material that the diametric dimensions are reduced without loss in the circular configuration thereof.

Still a further object of the present invention resides in a clamp structure of the type described above which is relatively simple to manufacture, yet highly effective for its intended purposes.

Another object of the present invention resides in a clamp structure for clamping relatively hard plastic hose materials onto fixed objects in which the clamp not only is able to retain its circular configuration during the clamping action but additionally can adapt itself readily to any deviations in the thickness of the plastic material.

A still further object of the present invention resides in a clamp structure of the type described above which can be easily installed, yet is capable of producing large clamping forces without loss of flexibility in the clamping band.

Another object of the present invention resides in a clamp structure of the type described above which is suitable for mass-production techniques on the assembly line and which results in highly reliable, consistent installation thereof by the use of pneumatic tools operating with predetermined pressures.

These and other objects, features and advantages of the present invention will become more apparent from the following description when taken in connection with the accompanying drawing which shows, for purposes of illustration only, several embodiments in accordance with the present invention, and wherein:

FIG. 1 is a plan view of a clamping band for a clamp structure in accordance with the present invention including fastening teeth of a novel fastening arrangement in accordance with the present invention;

FIG. 1a is a cross-sectional view taken along line Ia—Ia of FIG. 1;

FIG. 2 is a side elevational view of the clamping band of FIG. 1;

FIG. 3 is a plan view of a clamping member for use with the clamping band of FIGS. 1 and 2, in a clamping structure according to the present invention;

FIG. 4 is a side elevational view of the clamping member of FIG. 3;

FIG. 5 is an inside plan view on a part of the clamp structure of FIGS. 1 through 4, showing the various parts in the assembled condition but prior to the contraction of the ear;

FIG. 6 is a perspective, exploded view, showing the various parts of the clamp structure of FIGS. 1 through 4 just prior to assembly thereof; FIG. 7 is a plan view on a modified embodiment of a one-piece clamp structure in accordance with the present invention;

FIG. 8 is a side elevational view of the clamp structure of FIG. 7;

FIG. 9 is a cross-sectional view taken along line IX—IX of FIG. 7;

FIG. 10 is a partial perspective view of the inside of the clamp structure of FIGS. 7 and 8 when the clamp structure is closed and its parts are connected with each other but prior to contraction of the ear;

FIG. 11 is a cross-sectional view showing a modified embodiment of a clamp structure in accordance with the present invention, utilizing a wedge-shaped insert member;

FIG. 12 is a cross-sectional view of the wedge-shaped insert member of FIG. 11, taken along line XII—XII of FIG. 13;

FIG. 13 is a plan view on the wedge-shaped insert member of FIG. 12;

FIG. 14 is a cross-sectional view through a modified embodiment of a wedge-shaped insert member in accordance with the present invention;

FIG. 15 is a partial plan view on a band section provided with a rib-like projection and with slots in accordance with the present invention.

Figure 16:
FIG. 16 is a cross-sectional view, taken along line XVI—XVI of FIG. 15.

Referring now to the drawing wherein like reference numerals are used throughout the various views to designate like parts, and more particularly to FIGS. 1 and 2, these figures illustrate the clamping band generally designated by reference numeral 10 for use with a clamp structure in accordance with the present invention. The flat circumferential section 11 of the clamping band 10 is preferably provided with a central, rib-like projection extending substantially over the entire length thereof and being disposed radially inwardly of the circumferential section 11 in the installed condition of the band. The right-hand end of the band 11, as viewed in FIGS. 1 and 2, terminates in a tongue-like extension 13 which forms a continuation of the rib-like projection 12. The left-hand end of the band 11, as viewed in FIGS. 1 and 2, has a fork-like configuration generally designated by reference numeral 14, which is formed by the two fork tines 14a and 14b leaving therebetween a space 14c open from the left end thereof that is wider than the width of the tongue-like projection 13. The fork-like portions 14a and 14b are provided with rib-like projections 15a and 15b, which are of similar configuration as the central rib-like projection 12, and, in fact, overlap with the latter in the circumferential direction by a distance "0" indicated in FIG. 1. Teeth 16 are formed at a certain distance from the right-hand end of the clamping band 10 by punching-out small tabs and then bending the same at right angle so as to extend in the radially outward direction. In order to obtain end surfaces 17 (FIG. 2) of the teeth which slope in the radially outer direction in such a manner that the radially innermost point is closer to the respective band end than the radially outermost point thereof, a punching or stamping tool is used which forms cut-outs 18 in the form of parallelograms. As can be seen in FIG. 1, the cut-outs 18 are inclined at an angle other than 90° with respect to the circumferential direction, i.e., converge toward one another in the direction toward the tongue-like extension 13.

Near the opposite end of the band 11, i.e., near the left end thereof, similar teeth 16' are formed with inclined end surfaces 17', again sloping away from the respective band end in the radially outer direction. Teeth 16' again are formed by punching or stamping out tabs from the band, which leave openings 18' in the form of oppositely directed parallelograms after the punched or stamped-out tabs are bend at right angle to form the teeth 16'.

The clamping member generally designated by reference numeral 20 (FIGS. 3 and 4) includes a typical "Oetiker" ear generally designated by reference numeral 21 which consists of two generally radially outwardly extending wall portions 21a and 21b interconnected by a circumferential wall portion 21c provided with a groove 22 extending in the circumferential direction to impart greater holdability to the ear and therewith to the clamp.

The portion 23 of the clamping member 20 to the right of the ear 21 is provided with rectangular cut-outs 24 near the end to receive in the assembled condition the teeth 16 while the left-hand portion 23' of the clamping member, i.e., to the left of the ear 21, which is shorter than the right-hand portion 23, is provided with cut-out portions 24' to receive the teeth 16'. It should be noted that the cut-out portions 24 and 24' are rectangular in configuration and are of such depth in the transver direction of the band 20 so as to accommodate the teeth 16 and 16' which extend therethrough in the assembled condition of the clamp structure.

The dimensions and spacings of the various parts are thereby so chosen that engagement of teeth 16 in cut-outs 24 and of teeth 16' in cut-outs 24' causes the ear 21 to be covered off from underneath by the right-hand end of the band 11, i.e., by the part thereof located just ahead of the tongue-like extension 13, and the tongue-like extension 13 to just enter the recess 14c in the fork-like end 14. Contraction of the ear 21 would merely cause the two ends of the band to move closer to each other, i.e., to displace the tongue-like extension 13 further into the recess 14c. Moreover, to prevent an incorrect installation of the clamping member 20 relative to the band 10, the spacings and/or the number of the teeth 16 and cut-outs 24 may be different from those of teeth 16' and cut-outs 24'.

FIG. 5 illustrates the inside of clamp structure as assembled over a hose-like member but before contraction of the ear 21 with the hose-like member omitted for the sake of clarity. More specifically, the teeth 16 have extended through the cut-outs 24 and the teeth 16' through the cut-outs 24' while the tongue-like extension 13 is slidingly received between the fork-like members 14a and 14b. During contraction of the ear 21, the clamping band 10 can reduce itself in diametric dimension without loss in its circular configuration since the tongue-like extension 13 can slide into the recess 14c between the fork tines 14a and 14b. As is quite apparent, this reduction in diametric dimension takes place without the occurrence of any inward projection or protrusion over the entire circumference of the clamp. Moreover, the central rib-like projection 12 is in effect continued by the rib-like projections 15a and 15b within the area where the central rib-like projection 21 is interrupted, i.e., within the area where the tongue-like extension 13 moves between the fork tines 14a and 14b. Since the rib-like projections 12, 15a and 15b have been found to be of assistance in a completely satisfactory clamping action, especially when clamping relatively harder, thin-walled hose materials such as Hytrell axle boots having a Shore hardness of more than 90, this clamping action will exist uniformly over the entire circumference of the clamp structure, thereby eliminating the possibility of any non-tightness.

The two-partite construction illustrated in FIGS. 1 through 6 offers the distinct possibility of utilizing a relatively thin, flexible band material, for example, of stainless steel while utilizing a clamping member of much thicker material. This offers the great advantage of making the clamping band 10 of relatively flexible material so as to permit it to adapt itself to the circular configuration as well as to any deviations in the thickness of the hose material while the thicker clamping member 20 produces much greater clamping pressures. In actual use, the ear 21 is contracted by the use of pneumatic pincers so that the clamping structure is always clamped over the plastic hose-like object with the same force. Furthermore, if so desired, in order to facilitate the use of the clamp structure of FIGS. 1 through 6 on the assembly line, the clamping member may be more or less permanently preassembled to the band, for example, by bending the teeth 16 or 16' slightly over the remaining web portions intermediate the cutouts 24 or 24' to fix one end of the clamping member to the corresponding band end. Notwithstanding such preassembly, the clamping member can be readily removed in case of serivce needs by merely opening up the clamping member, for example, by cutting open the ear and by thereafter removing the clamping member from the thus pre-installed band end by the use of a screw driver or similar tool.

The embodiment of FIGS. 7 through 10 illustrates a clamp structure similar to the clamp structure of FIGS. 1 through 6 but made in one piece, i.e., made from a single band material. While this facilitates manufacture and assembly, it eliminates the possibility of utilizing a thicker material for that part of the clamp structure which corresponds to the clamping member of FIGS. 1 through 6, and more particularly for the ear. In FIGS. 7 and 8, the clamping member generally designated by reference numeral 30 includes a circumferential flat clamping band section 31 again preferably provided with a radially inwardly extending center rib-like portion 32 that is continued as tongue-like extension 33 at the left end of the clamping structure. Teeth 34 are again formed in a manner similar to the teeth 16 of FIGS. 1 through 6 by punching or stamping-out tabs in the shape of a parallelogram and thereafter bending over the thus punched-out tabs at right angle, thereby leaving cut-outs 35 of parallelogram shape. Near the right hand end of the band, a typical "Oetiker" ear generally designated by reference numeral 36 is provided which again consists of generally radially outwardly extending wall portions 36a and 36b joined by a circumferentially extending wall portion 36c in which is provided a groove 37 extending in the circumferential direction of the band to increase its holdability.

Near the right hand end of the clamping band 31 are provided rectangular cut-outs 40 to receive the teeth 34.

In order to prevent with certainty the occurence of any internal projection that may be occasioned by the tongue-like extension 33 during contraction of the ear 36, a punched-out section generally designated by reference numeral 41 is provided at a predetermined distance from the left side of the ear 36, which consists, going from the left to the right in FIG. 8, of a sharply rising portion 42 adjoined by a nearly flat or slightly downwardly sloping portion 43 which, in turn, is adjoined by a more steeply downwardly sloping portion 44. This punched-out portion 41 is obtained by a suitable punching tool embossing the section 41 after it is cut in the circumferential direction of the band on both sides thereof.

To assure good holding action by the rib-like projection 32 also within the area where the punched-out section 41 is located and where the center rib-like portion 32 is interrupted, two rib-like projections 45 are provided adjacent the punched-out section 41 which extend over such length of the circumference of the band that they overlap with the center rib-like portion 32, as best shown by the overlap 0' in FIG. 10.

FIG. 10 shows the arrangement of the various parts of the one-piece clamp structure of FIGS. 7 and 8 when assembled, i.e., when the teeth 34 are extended through the cut-outs 40 but before contraction of the ear 36. As can be seen from FIG. 10, the tongue-like extension 33 is in effect accommodated between the two rib-like projections 45 located on both sides of the punched-out section 41 in a manner similar to the arrangement of the tongue-like extension 13 received between the fork-like portions 14a and 14b in the embodiment of FIGS. 1 through 6.

The embodiment of FIGS. 11 through 13 illustrates a different approach as solution to the aforementioned problems in accordance with the present invention. More specifically, this embodiment illustrates how to clamp a plastic, relatively inelastic hose-like member such as an axle boot 51 onto a fixed support member 50, by the use of a clamping band 52 and of a clamping member generally designated by reference numeral 53 which may be of the type as disclosed in the U.S. Pat. No. 2,847,742 in which the band 52 is provided with openings over the entire length, and in which the clamping member 53 is provided with an "Oetiker" ear generally designated by reference numeral 54 consisting of radially extending side wall portions 55a and 55b joined by a wall portion 55c which again may be provided with a circumferential groove (not shown), and with hooks 56 at the end of the clamping member 53 for engaging into the openings of the band 52. According to the present invention, a wedge-shaped insert generally designated by reference numeral 57 is used between a portion of the hose-like member 51, on the one hand, and the band 52 and clamping member 53, on the other, which is in the shape of a circular segment. The wedge-shape insert 57 may be made of any relatively inelastic material such as aluminum or wood but is preferably made of a synthetic resinous material having relatively inelastic characteristics such as Nylon, Hytrell, polyvinyl chloride, or the like. To accommodate the ends of the hooks 56 and to prevent damage to the wedge-shaped insert 57, the latter is provided with recesses 58 FIGS. 12 and 13.

This particular arrangement also permits reduction in the diametric dimensions of the band 52 without any inner projections or internal protrusions. Moreover, the use of inwardly extending hooks, extending inwardly through the openings in the band 52, is possible without the danger of damaging the plastic hose material by the presence of the protecting insert 57. Inwardly extending hooks are preferable to optimize the clamping action since outwardly extending teeth, as shown for example, in the U.S. Pat. No. 3,321,811, tend to pull the clamping band away from the hose surface. The free ends of the insert 57 are provided with V-shaped notches 59 so as to increase the abutment force per unit area within the transitional area of the wedge-shaped ends of the insert 57.

FIG. 14 in which similar though primed reference numerals are used as in FIGS. 12 and 13, to designate corresponding parts, illustrates a modified embodiment of a wedge-shaped insert 57' in which the openings 58' extend clear through the insert member. Moreover, the insert member 57' which is used in particular for smaller clamp sizes, extends over a much greater circumferential length than the insert 57 of FIGS. 11 through 13, and may even extend over most, if not the entire, circumference of the hose-like object. Of course, the insert of FIGS. 11 through 13 may be modified to incorporate some or all of the features of the insert 57' of FIG. 14, for example, by the use of simple rectangular apertures 58 extending clear through the insert. In some applications, it may be appropriate to provide a small hump-like protrusion along the outside of the insert 57 or 57' within the area to be located underneath the ear of the clamping member so as to increase threat the specific abutment force.

As mentioned above, the use of embossments, indentations, or rib-like projections either in the inward or outward direction of a clamping band have the effect of stiffening the same so that it may lose its ability to adapt itself during the contraction of the ear to the circular shape of the plastic hose-like member and of the fixed member onto which it is intended to be clamped. Tests have indicated that such reinforcing projections may result in band sections more likely to retain their rectilinear configuration than the remaining part of the band. To obviate this situation, it has been found surprisingly that narrow slots 67 (FIGS. 15 and 16) cut into the projections 66 reinstate the flexibility of the band section without in any way weakening the band or the rib-like projections. This arrangement may be applied to any clamp structure in accordance with the present invention and more particularly to any part thereof which exhibits a tendency of retaining its rectilinear configuration more strongly than the remaining section of the band.

Though only one "Oetiker" ear has been shown in connection with the various embodiments of the clamp structure of the present invention, it is understood that also more than one ear, for example, two or three or more "Oetiker" ears appropriately spaced from one another, may be used depending on the amount of contraction to be obtained in the clamp.

While the fastening arrangement in accordance with the present invention, as used in FIGS. 1–10, and including the teeth 16, respectively, 16' and cut-outs 24, respectively, 24', is preferable for manufacturing cost reasons as well as ease of installation and reliability of operation, the present invention is not limited thereto but may utilize any other suitable fastening arrangement as known in the art, e.g., as disclosed in the U.S. Pat. No. 3,523,337. Similarly, any other suitable known clamping member or clamping means may be used in the embodiments of FIGS. 11–14, though again the clamping member as shown is preferable for cost, installation, and functioning reasons.

While I have shown and described several embodiments in accordance with the present invention, the same is not limited thereto but is susceptible of numerous changes and modifications as known to those skilled in the art, and I, therefore, do not wish to be limited to the details shown and described herein but intend to cover all such changes and modifications as are encompassed by the scope of the appended claims.

I claim:

1. A clamp structure for clamping a hose-like object onto a circular support member, which comprises clamping band means having open ends and deformable ear means adapted to contract the band means upon deformation thereof and leaving an at least narrow gap in the circumferential direction of the band means upon deformation of the ear means, characterized in that for purposes of reducing the diametric dimension of the band means by deformation of the ear means without internal projection in the clamp structure and without the external projection of the hose-like object, further means are provided in the clamp structure enabling relative movement of the open band ends of reduce the diametric dimension of the band means without internal projection or step-like offset in the inner diametric dimension of the band structure while retaining a circular configuration of the band means and at the same time effectively bridging the gap to prevent squeezing out of any material of the hose-like object into the gap.

2. A clamp structure according to claim 1, characterized in that the further means include radially inwardly directed rib-like projection means in the band means providing in effect a clamping action over the entire circumference thereof.

3. A clamp structure according to claim 2, characterized in that the band means has lateral areas and the rib-like projection means are formed by a substantially central rib-like projection extending substantially from one end of the band means to at least near the other end thereof, a section of the band means being devoid of a central rib-like projection and being provided thereat with lateral rib-like projections within the two lateral areas of the band means and overlapping said central rib-like projection at one side in the circumferential direction.

4. A clamp structure according to claim 1, 2 or 3, characterized by fastening means for fastening together the free ends of the band means, said fastening means including radially outwardly directed tooth-like means extending in the circumferential direction and arranged in two rows of the band means near one end thereof and complementary cut-outs provided in a corresponding portion of the clamp structure overlying said tooth means in the installed condition of the clamp structure and receiving said tooth-like means.

5. A clamp structure according to claim 4, characterized in that said further means include a tongue-like extension at one end of the band means forming a continuation of the central rib-like projection.

6. A clamp structure according to claim 5, characterized in that the other end of said band means is fork-shaped having two fork-like portions with a recess therebetween, the tongue-like extension being received between the fork-like portions in the installed condition of the clamp structure, and the fork-like portions being provided with said lateral rib-like projections.

7. A clamp structure according to claim 6, characterized in that the ear means is provided in a clamping member separate from the band means and is provided with said cut-outs near both ends thereof cooperating with two sets of tooth-like means provided in corresponding places in said band means.

8. A clamp structure according to claim 4, characterized in that said ear means is provided with a groove extending in the circumferential direction.

9. A clamp structure according to claims 1, 2 or 3, characterized in that said further means include a tongue-like extension at one end of the band means.

10. A clamp structure according to claim 9, characterized in that the other end of said band means is fork-shaped having two fork-like portions with a recess therebetween, the tongue-like extension being received between the fork-like portions in the installed condition of the clamp structure, and the fork-like portions being provided with lateral rib-like projections.

11. A clamp structure according to claim 4, characterized in that the ear means is provided in a clamping member separate from the band means and provided with said cut-outs near both ends thereof cooperating with two sets of tooth-like means provided in corresponding places in said band means.

12. A clamp structure according to claim 11, characterized in that said ear means is provided with a groove extending in the circumferential direction.

13. A clamp structure according to claim 4, characterized in that said clamp structure is in one piece and includes the ear means.

14. A clamp structure according to claim 13, characterized in that said lateral rib-like projections are provided in the band means spaced a predetermined distance from the ear means on the side thereof opposite said other end.

15. A clamping structure according to claim 14, characterized by a radially outwardly extending punched-out section in the center of the band means within the area thereof of the lateral projections to receive the end of said tongue-like extension when said clamp structure is installed.

16. A clamp structure according to claim 15, characterized in that said lateral rib-like projections extend from the end of said punched-out section in overlapping relationship to the central rib-like projection over a predetermined distance in the direction away from said ear means.

17. A clamp structure according to claim 16, characterized in that said tooth-like means have end surfaces which slope in the radially outer direction away from the corresponding end of the band means so that the radially innermost part of each surface is closer to the respective band end than the radially outermost part thereof.

18. A clamp structure according to claim 13, characterized in that said tooth-like means have end surfaces which slope in the radially outer direction away from the corresponding end of the band means so that the radially innermost part of each surface is closer to the respective band end than the radially outermost part thereof.

19. A clamp structure according to claim 4, characterized in that said tooth-like means have end surfaces which slope in the radially outer direction away from the corresponding end of the band means so that the radially innermost part of each surface is closer to the respective band end than the radially outermost part thereof.

20. A clamp structure according to claims 1, 2 or 3, characterized in that said further means include a wedge shaped insert means of relatively inelastic material, said ear means being provided in a separate clamping member having inwardly projecting hook-like ends adapted to engage in corresponding openings of the band means, said insert means being in direct contact with its inner curved configuration with the hose-like object and extending a predetermined distance over the circumference of the hose-like object, and the band means being in contact with any free part of the hose-like object not covered by said insert means and with a major portion of the outer circumference of the insert means so that the band means, upon being engaged by the hook-like ends of the clamping member and upon contraction of the ear means, exerts a clamping pressure directly onto the hose-like object where it is in direct contact therewith and indirectly by way of the insert means which it is in indirect contact therewith.

21. A clamp structure according to claim 20, characterized in that said insert means is made of polyvinyl chloride.

22. A clamp structure according to claim 20, characterized in that said insert means is provided with aperture means to receive the extending ends of the hook-like projections.

23. A clamp structure according to claim 22, characterized in that the aperture means are recesses in the insert means.

24. A clamp structure according to claim 22, characterized in that the aperture means extends clear through the insert means in the radial direction.

25. A clamp structure with rib-like projections according to claims 1, 2 or 3 characterized in that the rib-like projections are provided with narrow slots extending transversely thereof at least within a certain part thereof.

26. A clamp structure with rib-like projections according to claim 4, characterized in that the rib-like projections are provided with narrow slots extending transversely thereof at least within a certain part thereof.

27. A clamp structure with rib-like projections according to claim 11, characterized in that the rib-like projections are provided with narrow slots extending transversely thereof at least within a certain part thereof.

28. A clamp structure according to claim 13, characterized in that the rib-like projections are provided with narrow slots extending transversely thereof at least within a certain part thereof.

29. A clamp structure according to claim 13, characterized in that said further means include a tongue-like extension at one end of the band means forming a continuation of the central rib-like projection.

30. A clamp structure according to claim 1, characterized in that said clamp structure is in one piece and includes the ear means.

31. A clamp structure for clamping a hose-like object onto a circular support member, which comprises clampling band means having open ends and deformable ear means adapted to contract the band means upon deformation thereof and leaving an at least narrow gap in the circumferential direction of the band means upon deformation of the ear means, characterized in that for purposes of reducing the diametric dimension of the band means by deformation of the ear means without internal projection in the clamp structure and without the external projection of the hose-like object, further means are provided in the clamping band means within the area of the overlapping ends thereof which enable relative side-by-side overlapping movement of the open band ends to reduce the diametric dimension of the band means devoid of any step or sudden change in the internal diametric dimension thereof while maintaining an internal circular configuration of the band means complementary to the outer diametric dimension of the object and at the same time effectively bridging the gap to prevent squeezing out of any material of the hose-like object into the gap.

32. A clamp structure according to claim 31, characterized in that rib-like projection means are provided in the band means which are formed by a substantially central rib-like projection extending substantially from one end of the band means to at least near the other end thereof, a section of the band means being devoid of a central rib-like projection and being provided thereat with lateral rib-like projections within lateral areas of the band means and overlapping said central rib-like projection in the circumferential direction.

33. A clamp structure with a rib-like projection according to claim 31, characterized in that said further means include a tongue-like extension at one end of the band means forming a continuation of the rib-like projection.

34. A clamp structure according to claim 33, characterized in that the other end of said band means is fork-shaped having two fork-like portions with a recess therebetween, the tongue-like extension being received between the fork-like portions in the installed condition of the clamp structure, and the fork-like portions being provided with lateral rib-like projections.

35. A clamp structure according to claims 31, 32, 33 or 34, characterized in that the ear means is provided in a clamping member separate from the bank means.

36. A clamp structure according to claims 31, 32, 33 or 34, characterized in that the ear means is provided in a clamping member separate from the band means.

37. A clamp structure according to claim 32, characterized in that at least some of the rib-like projections are provided with narrow slots extending transversely thereof at least within a certain part thereof.

38. A clamp structure for clamping a hose-like object onto a circular support member, which comprises clamping band means having open ends and deformable ear means operable to contract the band means upon deformation thereof while leaving an at least narrow gap in the circumferential direction of the band means underneath the ear means upon deformation thereof, characterized in that for purposes of reducing the diametric dimension of the band means by deformation of the ear means without internal projection in the clamp structure and without the external projection of the hose-like object, the band means comprises further means including a tongue-like extension at one band end operable to enter a generally centrally located recess in the other band end which is fork-shaped to enable a truly circular reduction in the diametric dimension of the band means effectively without step-like offset or internal projection in the circumferential direction of the inner surface of the band means by relative movement of the tongue-like extension of the one end to the fork-shaped other end while at the same time effectively bridging the gap underneath the ear means by the tongue-like extension to prevent displacement of the hose-like object into the gap.

39. A clamp structure for clamping a hose-like object onto a circular support member, which comprises clamping band means having open ends and means operable to contract the band means characterized in that for purposes of reducing the diametric dimension of the band means without internal projection in the clamp structure, the band means comprises further means including a tongue-like extension at one band end operable to enter a generally centrally located recess in the other band end which is fork-shaped to enable a truly circular reduction in the diametric dimension of the band means effectively without step-like offset or internal projection in the circumferential direction of the inner surface of the band means by relative movement of the tongue-like extension of the one end to the fork-shaped other end.

40. A clamp structure according to claims 38 or 39, characterized in that a substantially central rib-like indentation extending from said tongue-like extension to the area of the recess is provided in said band means while lateral rib-like indentations are provided in the fork-shaped band end which overlap with said central rib-like indentation in the circumferential direction of the band means.

41. A clamp structure according to claim 40, wherein said means operable to contract said band means is in one piece with said band means.

42. A clamp structure according to claim 40, wherein said means operable to contract said band means is a separate member from said band means, and means in said band means and in said separate member for form-lockingly connecting the separate member with said band means.

* * * * *

UNITED STATES PATENT AND TRADEMARK OFFICE
CERTIFICATE OF CORRECTION

PATENT NO. : 4,237,584
DATED : December 9, 1980
INVENTOR(S) : Hans Oetiker

It is certified that error appears in the above—identified patent and that said Letters Patent is hereby corrected as shown below:

Claim 1

Line 13, change "of reduce the" to --to reduce the--.

Signed and Sealed this

Thirteenth Day of September 1983

[SEAL]

Attest:

Attesting Officer

GERALD J. MOSSINGHOFF

Commissioner of Patents and Trademarks